United States Patent [19]

Holm et al.

[11] Patent Number: 5,037,155
[45] Date of Patent: Aug. 6, 1991

[54] OPERATOR SEAT BASE

[75] Inventors: David R. Holm, Oconomowoc; Edgar J. Buehler, Pewaukee, both of Wis.

[73] Assignee: Deere & Company, Moline, Ill.

[21] Appl. No.: 558,037

[22] Filed: Jul. 25, 1990

[51] Int. Cl.⁵ .............................................. B60N 2/08
[52] U.S. Cl. .................................... 296/65.1; 297/344
[58] Field of Search ....................... 296/65.1; 297/344

[56] References Cited

U.S. PATENT DOCUMENTS

| | | | |
|---|---|---|---|
| 3,261,422 | 7/1966 | Jensen | 296/65.1 X |
| 4,114,947 | 9/1978 | Nelson | 297/344 |
| 4,198,092 | 4/1980 | Federspiel | 296/65.1 |
| 4,262,958 | 4/1981 | Houseman et al. | 296/65.1 |
| 4,549,765 | 10/1985 | Hoch | 297/311 |
| 4,648,657 | 3/1987 | Cox et al. | 297/341 |
| 4,666,208 | 5/1987 | Tatematsu et al. | 297/341 |
| 4,666,209 | 5/1987 | Kazaoka et al. | 297/344 |
| 4,687,251 | 8/1987 | Kazaoka et al. | 297/337 |
| 4,714,227 | 12/1987 | Holm et al. | 248/595 |
| 4,725,032 | 2/1988 | Kazaoka et al. | 248/430 |

OTHER PUBLICATIONS

Deere & Co., brochure entitled: "John Deere Lawn & Garden Tractors", published in the United States in 1985, front cover and p. 9.

Ford New Holland, Inc., brochure entitled: "Ford 8-to 18-hp Lawn, Yard and Garden Tractors, Riding Mowers", published in the United States by 1989, front cover and p. 5.

*Primary Examiner*—Margaret A. Focarino
*Assistant Examiner*—Gary C. Hoge

[57] ABSTRACT

A seat base having protruding members fixed to the underside thereof that are positioned within mating recesses formed in the fenderdeck of a vehicle. The base is clamped to the fenderdeck by a pair of screws. The screws and mating features defined between the seat base and fenderdeck secure the base to the vehicle to prevent shifting of the seat during operation. If the screws become loosened during operation, the protruding members will engage side walls of the recesses to prevent the base from shifting fore and aft suddenly and unexpectedly, and to alert the operator that the screws have become loosened.

7 Claims, 4 Drawing Sheets

OPERATOR SEAT BASE

BACKGROUND OF THE INVENTION

1. Field of the Invention

The invention relates to mechanisms for adjustably securing a seat to a vehicle.

2. Description of the Related Art

Conventional seats have been attached to vehicles such as lawn tractors in a variety of ways. Various devices have been provided having many mechanical parts that allow the operator to adjust the seat fore and aft. Tracks are provided for guiding the seat back and forth. To adjust the seat, the operator engages a lever which releases the seat from a locked position. The operator can then shift the seat fore and aft along the track. To again lock the seat in a fixed position, the operator then releases the lever, which causes a member to be engaged within an opening in a plate fixed to the vehicle. The plate has several openings such that the seat can be locked into a variety of different positions. These lever mechanisms have many parts, which increases the cost required to make and assemble the mechanism.

A more inexpensive type of mechanism for securing a seat to a vehicle provides a seat having bolts received within slots formed in members fixed to the vehicle. The bolts are positioned within slots, such that when the bolts are loosened the operator can slide the seat to the position that he desires. He then re-tightens the bolts to frictionally secure the seat in place. Many such conventional mechanisms provide painted metal parts that rub against each other as the seat is shifted fore and aft, thereby scratching the paint when the seat is adjusted. In an attempt to reduce such scratching, washers have been provided between the parts that rub against each other. It is known to provide mechanisms of this type with four bolts instead of two to more adequately secure the seat against pivoting about a vertical axis, as well as against shifting fore and aft. Some conventional mechanisms provide bolts that require the use of tools to tighten the bolts, while others provide bolts that can be tightened by hand.

During operation, the bolts used in this type of mechanism can become loosened. When loosened, the seat can rapidly shift forwardly or rearwardly during operation before the operator notices that the bolts are loose. Many such mechanisms provide slots that are inclined downwardly toward the front such that as a shorter operator adjusts the seat forwardly to reach the controls he will also be lowering the seat. Similarly, taller operators will shift the seat rearwardly and upwardly in the slots. When the bolts become loosened in these inclined slots, bumpy terrain and the weight of the operator may cause the seat to suddenly shift forwardly and downwardly within the slots. Such a sudden shifting of the seat upon which the operator is sitting may cause his hands or feet that are manipulating the controls to suddenly jerk. Sudden motion of the seat base may prevent the operator from performing vehicle operations requiring delicate or precise control.

It would be desirable to provide a mechanism for securing a seat to a vehicle to prevent fore and aft shifting of the seat, and also prevent pivoting of the seat about a vertical axis. It would be desirable for such a mechanism to be simple and comprised of few parts, while being inexpensive to manufacture and assemble. The mechanism should be capable of being manufactured by injecting plastic into a mold. A mechanism made of plastic material would be desirable, since plastic parts will not scratch painted metal parts as much as a mechanism made of metal will. Such a mechanism should allow the operator to adjust the seat fore and aft to the particular position he finds most comfortable. It would be desirable for such a mechanism to be adjustable without the use of tools. Also, it would be desirable for such a mechanism to allow the operator to sense when the seat is becoming unsecured during operation. The operator could then tighten the seat before it shifts suddenly.

SUMMARY OF THE INVENTION

The preferred embodiment of the present invention provides a plastic seat base hinged to the seat, and rests upon a surface of the vehicle such as a portion of the fender deck between the rear wheels. Protruding members are formed in the seat base and engage mating recesses formed in the fender deck. Cap screws that can be tightened by hand are positioned on each side of the base, and also pass through slots formed in the fenderdeck to secure the base to the vehicle. If the cap screws become loosened during operation, the protruding members formed in the base will engage the edges of the recesses formed in the fenderdeck to hinder or prevent the seat from suddenly shifting. When the operator wishes to adjust the position of the seat, he loosens the cap screws, lifts the seat base slightly to remove the protruding members from the recesses, and shifts the seat base to a new position. He then positions the protruding member into a different recess corresponding to the seat position he desires, and tightens the cap screws by hand.

DESCRIPTION OF THE PREFERRED EMBODIMENT

Figure 1:
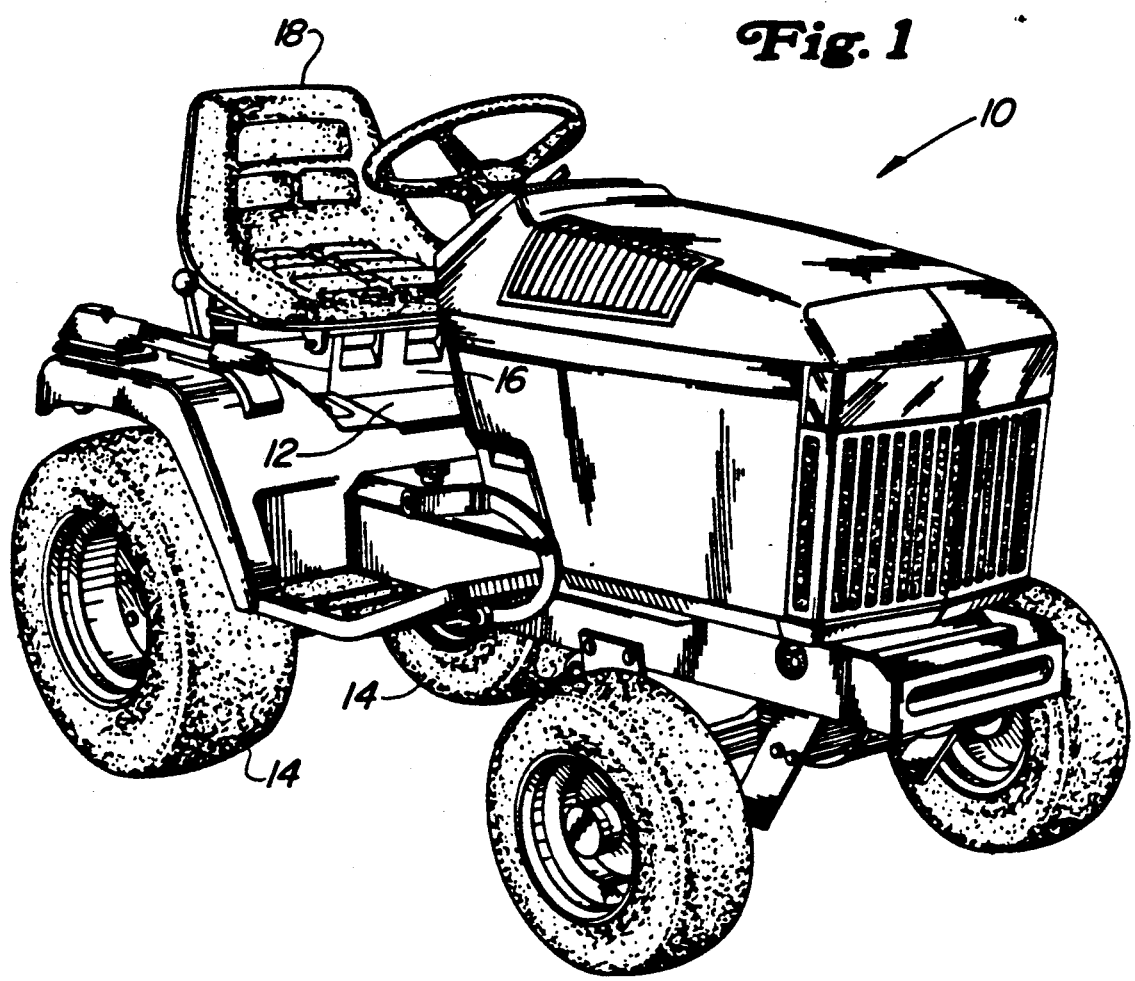
FIG. 1 is a perspective view of an operator seat base according to the present invention as used on a powered vehicle such as the tractor shown.

A vehicle 10, as seen in FIG. 1, provides a first member or fenderdeck 12 between its rear driven wheels 14. The preferred embodiment of the present invention provides a second member or seat base 16 carried by the fenderdeck 12 for coupling a seat 18 to the vehicle 10.

Figure 2:
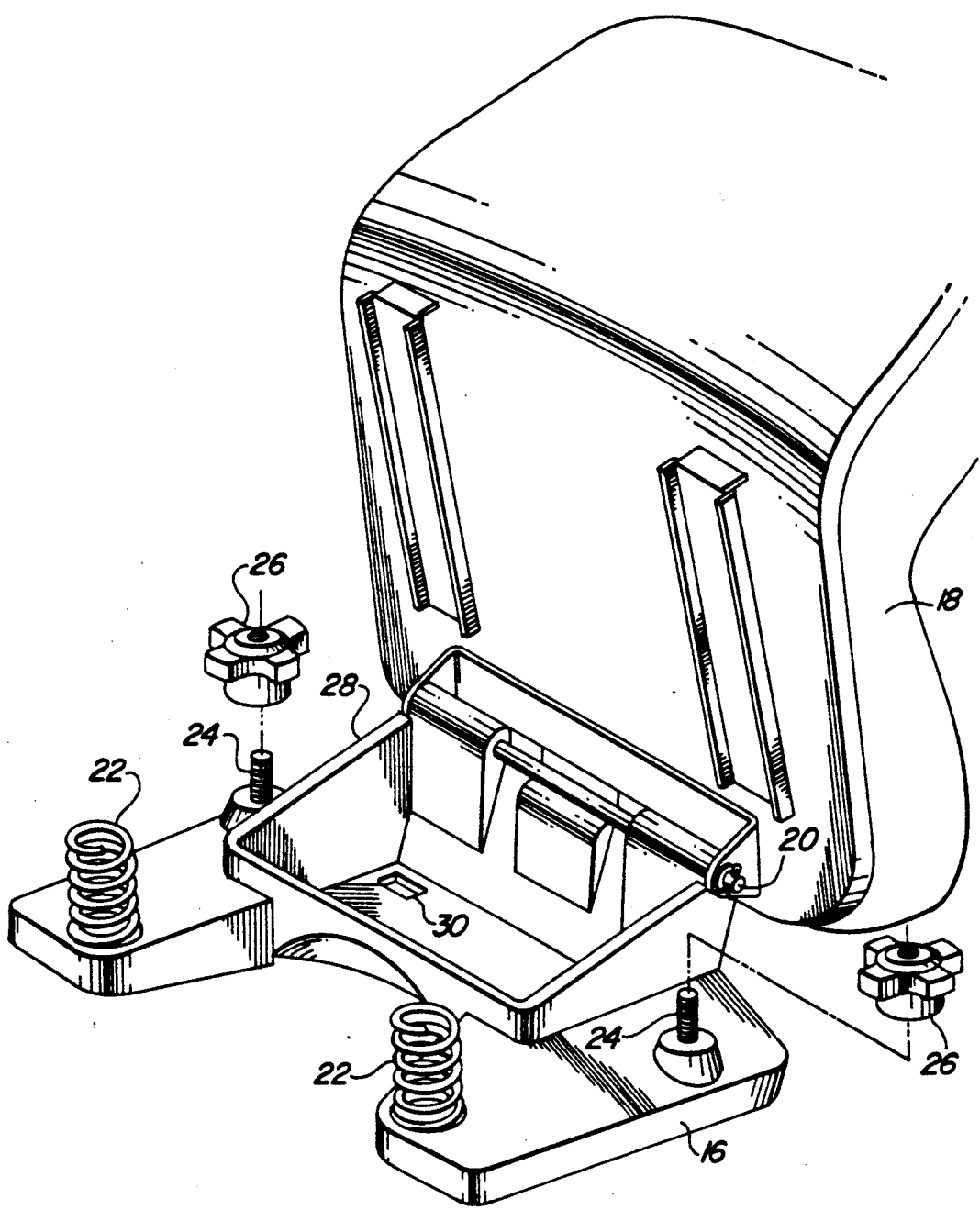
FIG. 2 is a perspective view of the seat base with the operator seat in a raised position, showing the nuts removed from the cap screws.

Referring now to FIG. 2, there is shown the seat 18 hinged to the seat base 16 via a rod 20. The seat base 16 is manufactured according to the preferred embodiment by injection molding plastic. Springs 22 positioned at the rear of the base 16 act to cushion and support the seat 18 during operation over bumpy terrain. Cap screws 24 pass through the base 16 and have nuts 26 threaded onto the screws 24. The nuts 26 can be tightened against the seat base 16 by hand, and serve to secure or clamp the seat base 16 to the fenderdeck 12. The preferred embodiment includes a tool box 28 formed in the seat base 16 that can be accessed by raising the seat 18, as shown. An opening 30 is provided in the seat base 16 through which shut-off wires pass from the seat 18 to the engine. When the operator lifts his weight from the seat 18 with the engine running, the shut-off mechanism will automatically turn off the engine and mower blade. The opening 30 also serves as a water drain hole through which accumulated moisture may drain from the seat base 16.

Figure 3:
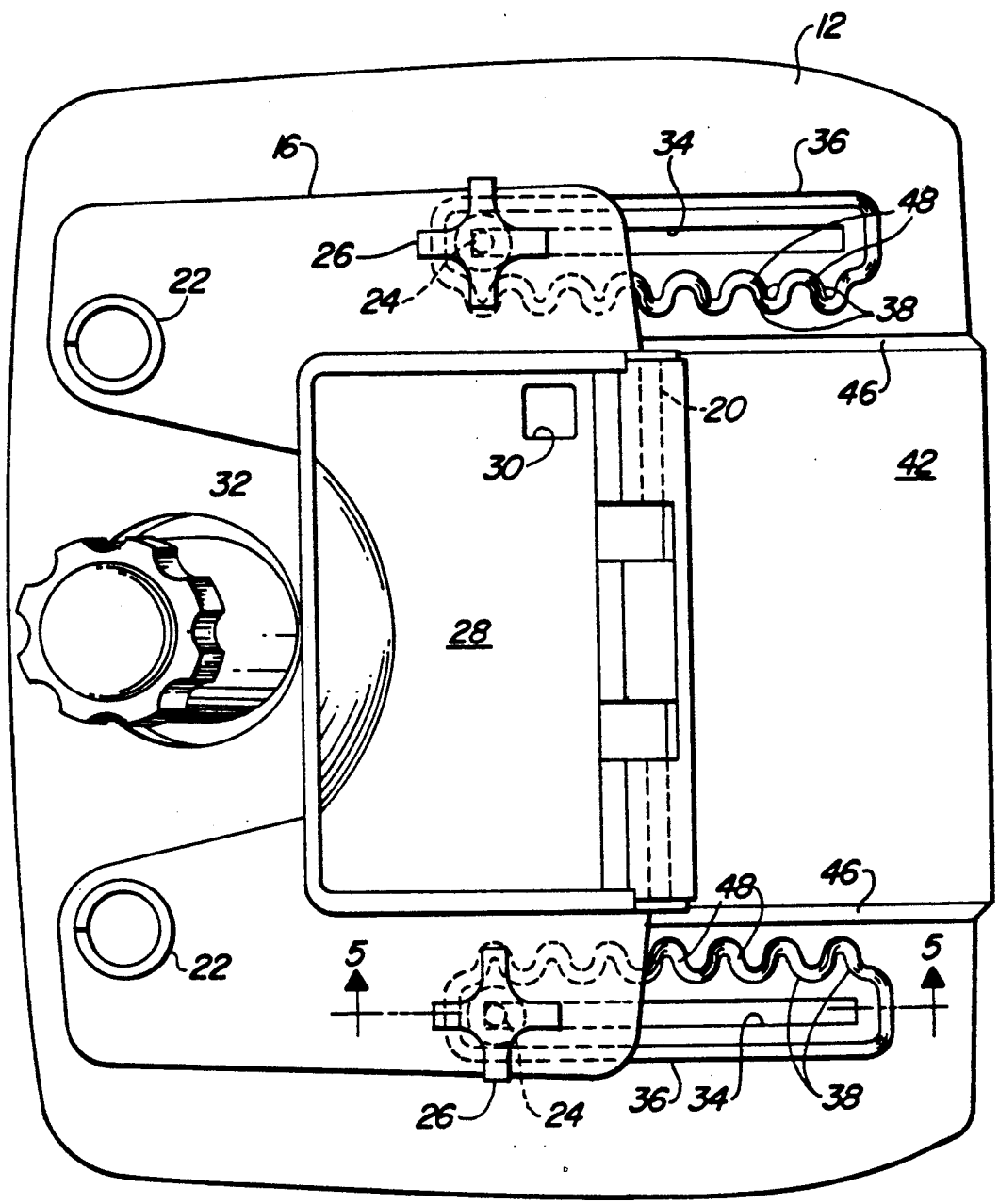
FIG. 3 is a top view of the seat base on the fenderdeck with the seat not shown.
Figure 4:
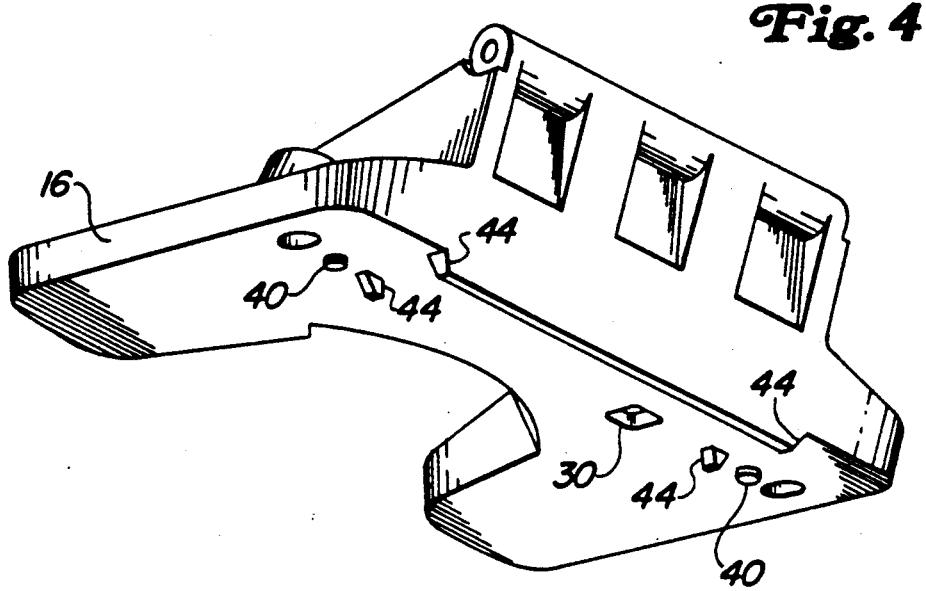
FIG. 4 is a perspective view of the underside of the seat base, showing the protruding members.
Figure 5:
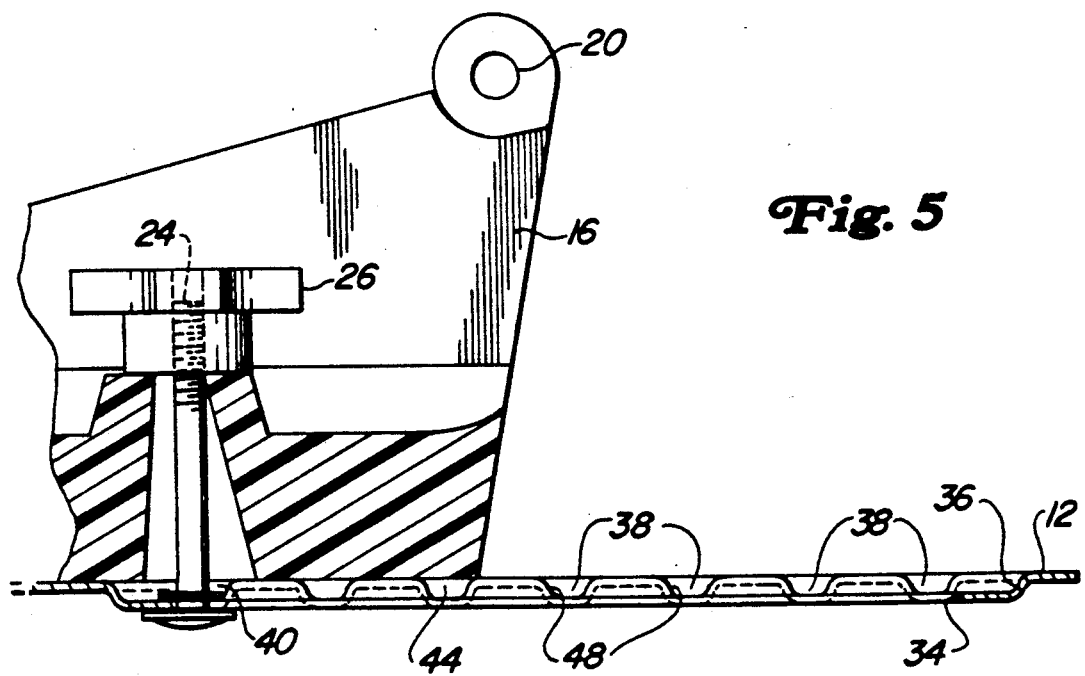
FIG. 5 is a sectional view from the side, showing the seat base in engagement with the fender deck.

Referring now to FIG. 3, there is shown an overhead view of the seat base 16 and fenderdeck 12. A gas tank inlet 32 is positioned between the springs 22. The fenderdeck 12 defines slots 34 though which the screws 24 pass to secure the base 16 against the fenderdeck 12. The screws 24 slide within the slots 34 when the nuts 26 are loosened to allow the seat base 16 to be shifted fore and aft. The slots 34 are formed in hollows 36 defined by the fenderdeck 12. The hollows 36 of the preferred embodiment each define seven side recesses 38. These side recesses 38 receive side protruding members 40 formed on the bottom of the base 16, as shown in FIG. 4. The side protruding members 40 and the side recesses 38 form mating features between the base 16 and the fenderdeck 12 for deterring the base 16 from shifting fore and aft. Referring now to FIG. 3, there is shown a central recess 42 formed in the fenderdeck 12 between the side recesses 38. Central protruding members 44 are formed in the bottom of the base 16, as shown in FIG. 4, and are received within the central recess 42 during operation. The central protruding members 44 engage the side walls 46 of the central recess 42 during operation to help keep the base 16 from shifting laterally. Also, the central protruding members 44 help prevent the seat base 16 from pivoting about a vertical axis.

Next, the operation of the preferred embodiment will be discussed. During normal operation, the seat 18 is hinged to the seat base 16 via the rod 20, and the seat base 16 rests on the fenderdeck 12. The central protruding members 44 are positioned within the central recess 42 formed in the fenderdeck 12. The side protruding members 40 are positioned within respective side recesses 38, and the nuts 26 are tightened down on the screws 24 sufficient to press the seat base 16 against the fenderdeck 12. As the vehicle 10 encounters rough terrain, the seat base 16 is prevented from shifting fore and aft by the screws 24 and nuts 26 that frictionally secure the base 16 against the fenderdeck 12. In addition, the side protruding members 40 engage the side walls 48 of the side recesses 38 to hinder the seat base 16 from shifting fore and aft.

Similarly, the seat base 16 is prevented from shifting laterally during operation. The nuts 26 and screws 24 act to secure the base 16 against the fenderdeck 12 to prevent lateral movement of the base 16. Also, the central protruding members 44 will engage the side walls 46 of the central recess 42 defined in the fenderdeck 12 in order to hinder the base 16 from laterally shifting during operation over rough terrain. Since the central protruding members 44 engage the side walls 46 of the central recess 42 at four points, the base 16 is deterred from pivoting about a vertical axis while held against the fenderdeck 12 by the screws. The seat base 16 is therefore hindered from spinning on the fenderdeck 12.

During operation, the nuts 26 may become loosened on the screws 24. Bumpy ground conditions and quick turns of the vehicle will make the seat base 16 want to shift relative to the fenderdeck 12 since it is no longer frictionally secured by the screws 24. However, the side protruding members 40 will abut the side walls 48 of the side recesses 38 within which they are situated to hinder fore and aft shifting. Also, the central protruding members 44 will abut the side walls 46 of the central recess 42 to hinder lateral shifting of the base 16. Therefore, the protruding members 40, 44 hinder the base from shifting with respect to the fenderdeck 12 when the nuts 26 have become loosened. The operator will sense that the nuts 26 have become loosened since the protruding members 40, 44 shift slightly within the recesses 38, 42 in the fenderdeck 12. The operator therefore experiences a jiggling, or rattling of the seat base 16, but not a sudden or large slippage. When the operator perceives this jiggling he can then tighten the nuts 26 by hand and thereby prevent sudden and large shifting of the seat 18.

The present invention allows the operator to adjust the seat base 16 fore and aft. To do this he loosens the nuts 26 by hand a sufficient amount to allow the side protruding members 40 to rise up and over the side walls 48 formed by the side recesses 38. Once loosened, the operator lifts the seat base 16 slightly and repositions the side protruding member 40 in the side recesses 38 corresponding to the seat position he desires. He then can hand tighten the nuts 26 to secure the base 16 against the fenderdeck 12 for operation.

The seat base 16 of the preferred embodiment is made of a plastic material, such that scratching of the painted fenderdeck 12 as the seat base 16 is shifted fore and aft is minimized. Prior art mechanisms have utilized washers positioned between the seat base 16 and the fenderdeck 12 to hold the base 16 above the fenderdeck 12 in order to reduce scratching. The need for such washers is eliminated by the preferred embodiment of the present invention since the plastic seat base 16 reduces the amount of scratching that will occur.

The preferred embodiment of the present invention provides two screws 24 for clamping the seat base 16 to the fenderdeck 12, whereas many prior art mechanisms provide four screws. The use of only two screws 24 allows the slots 34 to be shorter than if four screws were used, while still allowing the same range of motion of the seat base 16 within the slots 34. For example, if four screws were used to secure the seat base 16 to the fenderdeck 12, and it is desirable for the seat to be shiftable ten inches fore and aft, the slots would have to be fourteen inches long if the two screws on each side were spaced four inches apart. On the other hand, if only two screws are used in the same example, the slots need only be ten inches long. Since the slots 34 define smaller openings in the fenderdeck 12 than if four screws were used, the fenderdeck is stronger and less likely to be deformed during periods of rough use.

I claim:

1. A mechanism for attaching a seat to a vehicle, said mechanism comprising:
   a first member fixed with the vehicle;
   a second member fixed with the seat and in engagement with the first member;
   clamping means for frictionally securing the first member to the second member to prevent fore and aft movement of the second member, said means having tightened and untightened positions;
   means for preventing fore and aft shifting of the second member relative to the first member when the clamping means is in an untightened position, said means for preventing including a portion connected with the second member in operative engagement with a portion of the first member.

2. A mechanism for attaching a seat to a vehicle, said mechanism comprising:
a first member fixed with the vehicle;
a second member fixed with the seat and in engagement with the first member;
clamping means for frictionally securing the first member to the second member to prevent fore and aft movement of the second member, said means having tightened and untightened positions;
recesses formed in one of the members and staggered fore and aft with respect to the vehicle;
a protruding member formed in the member that does not have the recesses, said protruding members being selectively positionable within the recesses for hindering fore and aft shifting of the first member when the clamping means is in its untightened position.

3. A mechanism for attaching a seat to a vehicle, said mechanism comprising:
a first member fixed with the vehicle and having recesses staggered fore and aft with respect to the vehicle;
a second member fixed with the seat;
clamping means for frictionally securing the first member to the second member to prevent fore and aft movement of the second member, said means having a tightened and an untightened position, and
protruding members formed in the second member and selectively positionable within the recesses for hindering fore and aft shifting of the first member when the clamping means is in its untightened position.

4. The invention of claim 3, and further comprising:
a first recess formed in the first member and offset from the clamping means;
a second protruding member fixed with the second member and positionable within the second recess for preventing lateral shifting of the second member relative to the first member.

5. The invention of claim 3, wherein the second member is a plastic material.

6. The invention of claim 3, wherein the first member is a fenderdeck carried by the vehicle.

7. The invention of claim 4, wherein the clamping means further comprises:
a screw positioned within an opening in the second member, and shiftable within a longitudinal slot formed in the first member;
a nut threaded onto the screw and tightenable to secure the first member against the second member.

* * * * *